United States Patent [19]

Sun

[11] Patent Number: 5,374,141
[45] Date of Patent: Dec. 20, 1994

[54] MAT FORMING APPARATUS

[75] Inventor: Bernard C.-H. Sun, Chassel, Mich.

[73] Assignee: Board of Control of Michigan Technological University, Houghton, Mich.

[21] Appl. No.: 55,912

[22] Filed: Apr. 29, 1993

Related U.S. Application Data

[63] Continuation of Ser. No. 757,549, Sep. 11, 1991, abandoned.

[51] Int. Cl.$^5$ ............................................. B65G 53/14
[52] U.S. Cl. ............................................ 406/92; 406/96; 406/151; 406/165
[58] Field of Search ............. 406/92, 100, 96, 151, 406/153, 165, 171

[56] References Cited

U.S. PATENT DOCUMENTS

| | | | |
|---|---|---|---|
| 1,483,248 | 2/1924 | Stukenborg | 406/152 X |
| 2,624,641 | 1/1953 | Smith | 406/100 |
| 2,946,629 | 7/1960 | Headley | 406/96 X |
| 3,011,830 | 12/1961 | Holtzclaw | 406/151 X |
| 3,297,242 | 1/1967 | Karp | 406/151 X |
| 3,306,674 | 2/1967 | Diehm | 406/96 X |
| 3,552,801 | 11/1968 | Gilbreth | 406/171 X |
| 3,876,260 | 4/1975 | Moss et al. | 406/152 X |
| 4,232,632 | 11/1980 | Kice | 406/171 X |
| 4,278,240 | 7/1981 | Archenholtz | 406/151 X |
| 4,913,597 | 4/1990 | Christianson et al. | 406/171 X |
| 4,973,203 | 11/1990 | Oftedal | 406/152 |
| 5,088,860 | 2/1992 | Stockdale et al. | 406/153 |

FOREIGN PATENT DOCUMENTS 295416  4/1913  Germany .............................. 406/92

*Primary Examiner*—David M. Mitchell
*Assistant Examiner*—Gary C. Hoge
*Attorney, Agent, or Firm*—Michael, Best & Friedrich

[57] ABSTRACT

Mat forming apparatus comprising, in combination, a hollow material transporting member, drive structure for producing a pressure differential across spaced portions of the transporting member so that material is propelled from one of the spaced portions to the other within the hollow transporting member, material directing structure communicating with the drive structure for receiving material from the hollow transporting structure and, responsive to the drive structure, operative to direct the received material in a predetermined path, the hollow transporting member having a non-linear inner surface so that flow in the hollow transporting member is turbulent causing the material being transported therein to experience turbulent flow in being propelled from one of the spaced portions to the other, and structure associated with the material directing structure for receiving the material and confining the received material in a defined space.

7 Claims, 2 Drawing Sheets

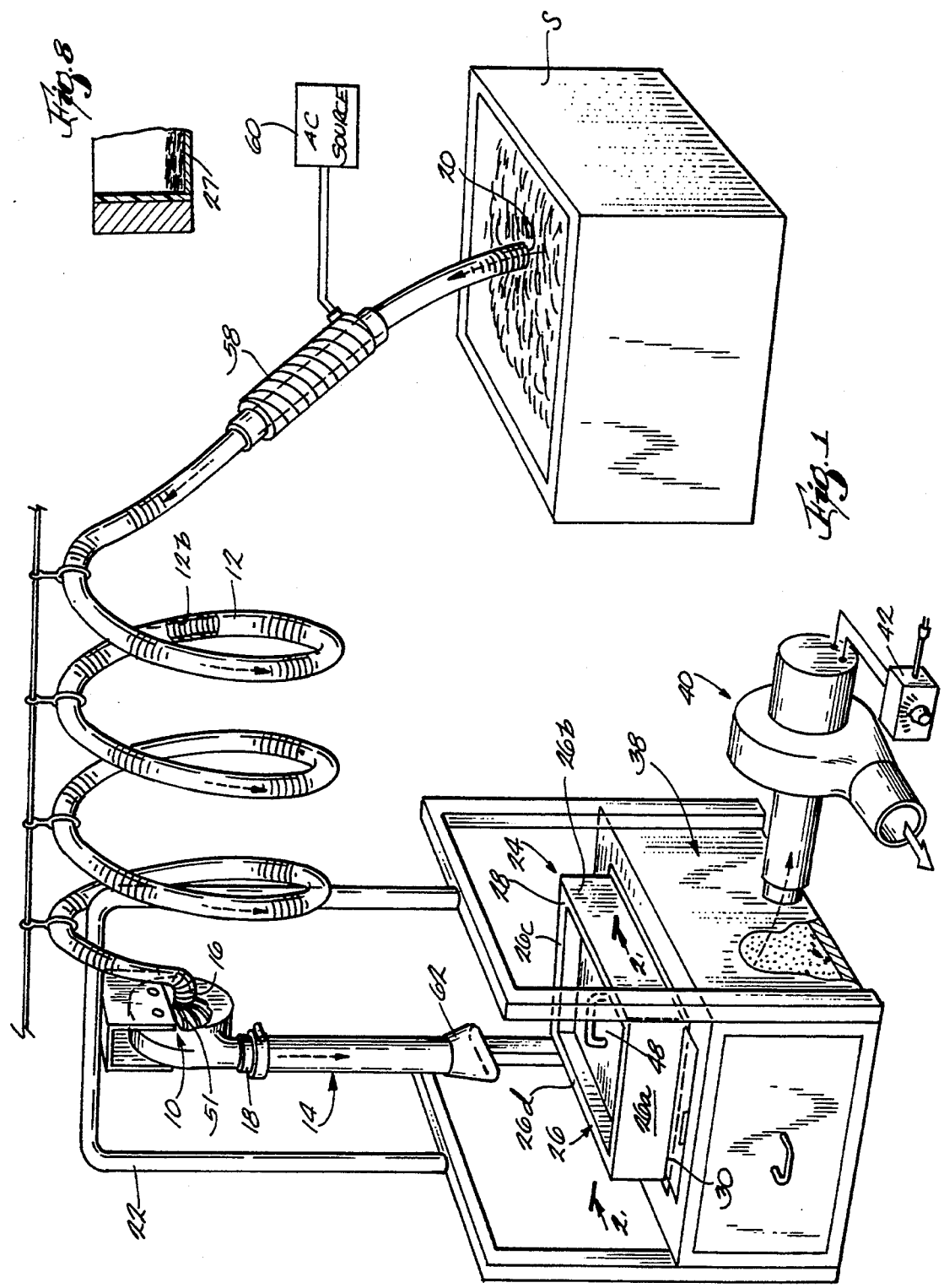

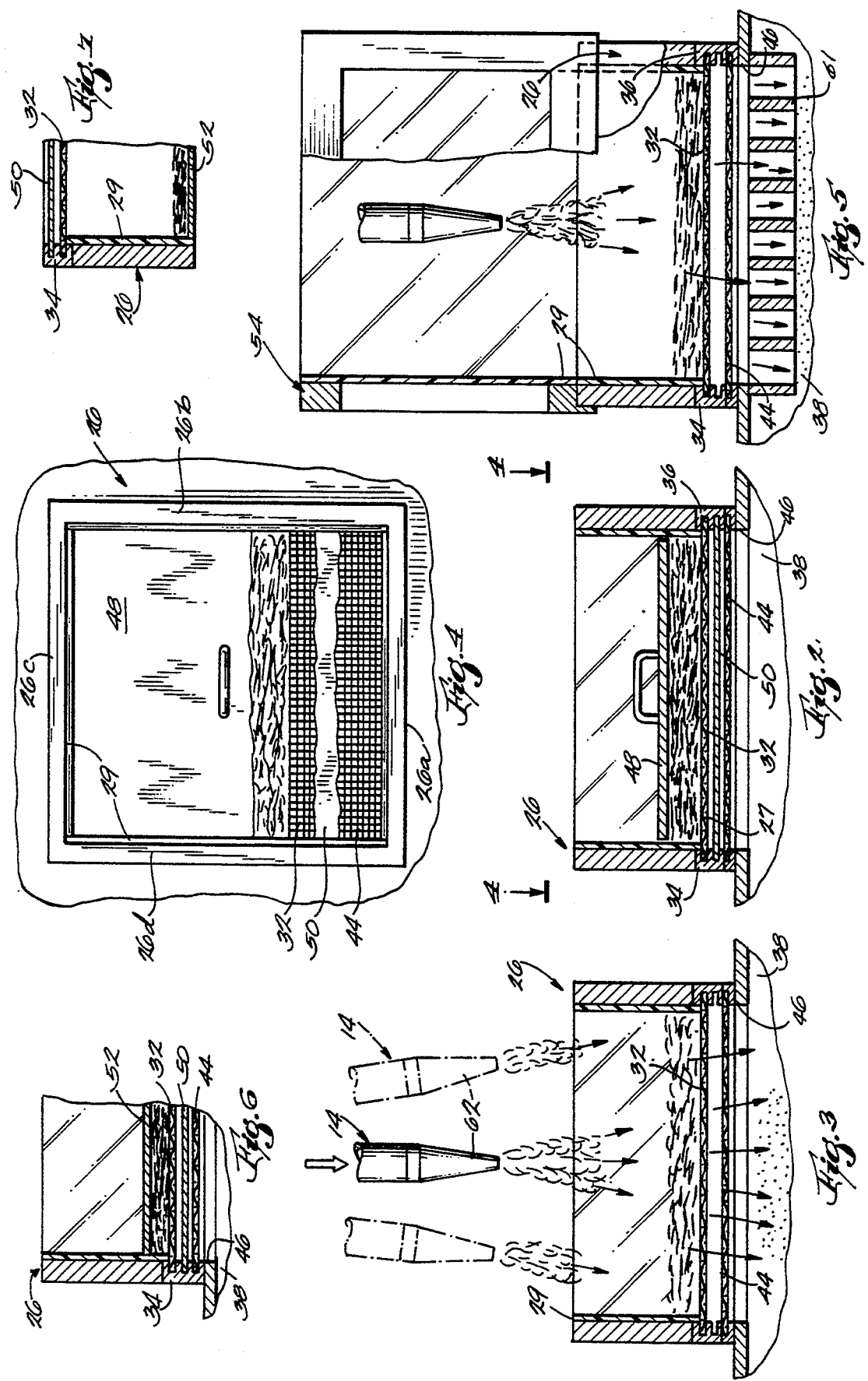

MAT FORMING APPARATUS

This application is a continuation of Ser. No. 07/757,549, filed Sep. 11, 1991, now abandoned.

BACKGROUND OF THE INVENTION

This invention relates to mat forming apparatus or generally to material handling apparatus.

There are various applications where various mat-forming materials, such as natural and man-made fibers, particles, granules, filaments, slivers, strands, flakes, and the like, are processed to form a mat which is then further processed to arrive at a desired product. Such products can be reconstituted fiberboard, reinforced plastics, other composite articles, or the like. Various arrangements have been proposed for building such mats, for example gravity feed of the materials into a suitable mold, die, or other holding device, and arrangements which add a vibratory mechanism to the gravity feed. Some of the problems encountered in such prior art arrangements are the materials are either entangled at the start or become entangled in the process, such that they are delivered to the die in clumps. Also, they may become undesirably stratified due to differences in specific gravity, size and geometry of different materials. In addition, they may have a moisture content which is too high and, therefore, must be separately dried before further processing.

By way of further explanation, if delivered in clumps, or undesirably stratified, the uniformity and structural characteristics of the final product is affected. As a specific prior art problem, mats can be processed to composite articles through a compaction step wherein the fibers, with suitable binders, are compressed under heat and pressure. Too high a moisture content in the mats can result in steam being generated in the compaction step which can interfere with the compaction step and/or adversely affect the end product.

Among the objects of this invention is to provide a mat forming apparatus which provides generally uniform distribution of various materials or material mixes throughout the formed mat.

Another object of this invention is to provide a mat forming apparatus which inherently reduces the high moisture content of the materials being used to form the mat and which lends itself well to additional moisture removal.

A more general object of this invention is to provide apparatus capable of breaking up entangled materials and/or drying such materials as desired.

For the achievement of these and other objects, this invention proposes having a hollow material transporting member and drive means for producing a pressure differential across spaced portions of the transporting member so that materials are propelled from one spaced portion to the other within the hollow transporting member. Material directing means is also provided which communicates with the drive means for receiving materials from the hollow transporting means and, responsive to the drive means, is operative to direct received materials in a predetermined path. The hollow transporting member has a non-linear inner surface so that flow therethrough is turbulent causing materials being transported therein to experience turbulent flow in traveling from one spaced portion to the other. The apparatus may also include an arrangement associated with said material directing means for receiving the materials and confining received materials in a defined space.

Preferably, mat forming apparatus is made up of a blower and an elongated, hollow corrugated hose or tube, one end of which is open and the other end of which is attached to the inlet end of the blower so that the blower produces a pressure differential across the ends of the corrugated tube and the materials are propelled from the open end of the corrugated tube to the other end. A hollow, generally flexible or rigid, but swingable, tubular member has one end connected to the outlet of the blower and its other end freely movable and operative to direct received materials in a predetermined path or direction. The corrugated tube defines a non-linear inner surface so that flow in the corrugated tube is turbulent and causes materials to experience turbulent flow in being propelled from the open end to the blower. The arrangement also includes a frame associated with the hollow, flexible member for receiving and confining received materials in a defined space.

Preferably, the drive is a centrifugal blower and the materials are transported through the blower where they are further separated or mixed. Also, the apparatus includes a member having an interstitial construction such as a screen extending across the lower end of the frame to provide, at that point, a generally open construction permeable to air while preventing the passage therethrough of materials so that materials are accumulated in the frame. It is also contemplated that an exhaust arrangement will be associated with the frame to receive air passing through the frame, the exhaust mechanism itself being covered by the same type of member extending over the lower end of the frame and through which air must pass and against which the materials are directed. Means can also be included for withdrawing air from the interior of the exhaust mechanism to thereby enhance the overall flow of air through the apparatus while further augmenting the collection of the material in the formation of the mat.

Other objects and advantages will be pointed out in, or be apparent from, the following specification and claims as will obvious modifications of the embodiment shown in the drawings in which:

FIG. 1 is a perspective view of the preferred embodiment;

FIG. 2 is a sectional view taken along line 2—2 in FIG. 1;

FIG. 3 is a sectional view similar to FIG. 2 but showing the device in use, building up a mat;

FIG. 4 is a top view of FIG. 2 with parts broken away for clarity;

FIG. 5 is a sectional view similar to FIG. 3, showing an alternative embodiment;

FIG. 6 is a partial section of a compacted mat, prior to inverting;

FIG. 7 is a partial section of an inverted frame, with the mat deposited for transfer to a finishing station; and FIG. 8 is a partial section of an alternative embodiment.

DESCRIPTION OF THE PREFERRED EMBODIMENT

A preferred embodiment of this invention is illustrated in the drawings. Examples of materials which can be processed effectively with this arrangement are whiskers, filaments, wools, fibers, particles, granules, slivers, small strands or flakes, and the likes of alumina, asbestos, beryllium, boron, carbon (graphite), ceramics, glasses, kevlar, molybdenum, nylon, thermoplastic and thermosetting resins, rocks, rubbers and other elastomers, silicon carbide, steel, titanium, tungsten, other natural and man-made materials or mixtures of such materials or other similar materials. For convenience, the invention will be described with reference to wood fibers, it being appreciated that it does have other applications. Whatever material, or materials, that are being processed will come from a source S.

A blower 10 is connected to an elongated hose 12 and a second, elongated hose, or spout, 14. The blower is a centrifugal type blower and hose 12 is connected to the inlet of the blower through a suitable fitting 16. Similarly, spout 14 is connected to the outlet of the blower through a suitable fitting 18. With this arrangement, the blower provides a drive mechanism for drawing material through hose 12 and through the blower body, discharging that material through the spout 14. More particularly, the blower creates a pressure drop across the open or free end 20 of the hose 12 and the end of that hose connected to fitting 16 which causes material to flow through the hose to the blower.

Blower 10 is suitably connected to a bracket assembly 22 with the hoses 12 and 14 attached to and hanging loosely relative to the blower body.

A receiving assembly 24 is located beneath the blower 10, specifically beneath spout 14. This assembly includes a basic frame 26. The frame 26 is positioned beneath spout 14 and is made up of sidewalls 26a, b, c, and d. which define opposite vertical ends 28 and 30. Material drawn through hoses 12 and expelled through spout 14 is discharged into the frame 26. The spout 14, being flexible or rigid but swingable, can be manipulated to provide an even distribution of the material across the horizontal extent of the frame 26.

The simplest form of frame 26 is to have a closed bottom, such as a plate 27 attached to the underside of the frame as shown in FIG. 8, for the collection of fibers. To facilitate and enhance depositing the materials in an effective manner in frame 26, the lower end 30 of frame 26 is covered with a member having an interstitial type construction, i.e., a member having intersecting elements with spaces therebetween. The size of the openings depends on the size of the fibers being processed, the purpose being to allow the transporting airstream to pass freely while the fibers are captured by the frame. In the preferred embodiment, a screen 32 of suitable, predetermined mesh size is used. This screen is attached to the bottom end of the frame by brackets 34 and 36 attached to the frame.

Frame 26 and screen 32 are positioned above an exhaust box 38. The exhaust box is open to the screen 32 and forms a false bottom for frame 26. In this manner, the flow of material toward frame 26 is interrupted by screen 32 while the air, which provides the moving force for the fibers, can pass freely through the screen. More particularly, the air moves through screen 32 into the exhaust box 38 which also may be provided with a blower 40 connected in a conventional manner to the interior of box 38 and capable, when energized, to draw a vacuum in box 38. This vacuum enhances the flow of the materials into the frame 26 and further enhances the effective depositing of the materials above screen 32. A variable transformer 42 is connected to blower 40 so that the speed of the blower can be adjusted as desired. Similarly, a variable transformer (not shown) may be attached to blower 10 to control its speed.

It should be noted at this point, that hose 12 is corrugated and the interior surface 12b thereof, shown in a cut-away in FIG. 1, is interrupted and non-linear. By providing the interrupted surface on the interior of the hose 12, the air being drawn through that hose does not follow a linear path but is generally turbulent. As a result of this turbulence, materials drawn into the hose 12 through open end 20 also follow a non-linear, turbulent path. The advantages of this turbulence within the hose is that it tends to break up clumps of material into individual fibers or smaller clumps and, as will be discussed hereinafter, if a number of materials are used, tends to thoroughly mix those materials. Entanglement of materials may be caused by, for example, the natural tendency of certain materials to become entangled, attachment through adhesive coating where such coatings are used and/or static electricity. The individual fibers and/or smaller clumps when deposited in frame 26, make for a mat build-up which has a more uniform consistency.

In that same regard, the advantage of using a centrifugal blower is that the fibers are drawn through the interior of the blower, i.e., through the blower impeller blades 51, which will break up clumps of and/or mix the fibers further. The fibers, then in discrete form or in smaller clumps, are discharged through the spout 14 and into the frame. It will be noted that spout 14 is larger in diameter than hose 12. The advantage here is that a smaller diameter hose 12 enhances the turbulence within that hose which then provides thorough breakdown of the clumps and/or thorough mixing of the materials. The mixed and/or broken down materials, as they leave blower 10, are readily accommodated in the greater diameter spout 14 from which they are deposited in frame 26 in that separated, discrete form and are not given the opportunity to co-mingle and form clumps again.

It has been found that by breaking down clumps of the materials and by the mixing action in hose 12 due to the corrugated inner surface, and then propelling those particles into the frame 26 with the air from blower 10 as a driving or motive force, an even distribution in the materials in the frame 26 to provide a mat with consistent material characteristics is achieved. This is improved as compared to a strict gravity feed or even a gravity feed enhanced by a vibratory mechanism, in which arrangements the materials tend to stratify in the mat based on their specific gravity, size, and/or geometry. That is, with a straight gravity feed or even one used with a vibratory assembly, the higher specific gravity and finer materials will tend to accumulate toward the bottom of the mat, while the lesser specific gravity or bulky materials will tend to accumulate toward the top of the mat. Obviously, any clump of material is an undesirable feature as it produces an undue concentration in one area of the mat and, similarly, uneven distribution of materials is not desirable.

It is also desirable to have a second screen 44 extend across the opening 46 in exhaust box 38 at the outlet of frame 26 and beneath screen 32. This provides a better base against which material can accumulate while allowing free passage of air.

To complete the mat forming procedure, the mat is removed from the overall apparatus in the following manner. Optionally, a compactor 48 is placed on the upper surface of the formed mat and can be pressed down manually or through some automatic means (not shown), and optionally with the concurrent of vacuum suction in box 38 to remove air trapped in the mat. Once the desired compactness of the mat has been achieved, the frame 26 is removed from the apparatus. A plate 50, preferably of metal, is inserted between screens 32 and 44 before removal, plate 50 can be impervious to air or a stiff screen as desired.

After the compactor is removed, a second impervious plate 52 is placed over the top of the formed mat. The assembly consisting of frame 26 and, from top to bottom, plate 52, the formed mat, screen 32 and plate 50 is inverted. The frame 26 assists in retaining materials in the loose mat during the inversion and assists in reducing the sideway spread of dust materials during the post-mat forming cold and hot pressing operation. After removing the frame 26, plate 50 and screen 32, a formed mat is left on the second plate 52. The formed mat can then be taken to another station (not shown) for further processing. For example, where the materials are wood fibers and the final product is a reconstituted wood fiber product, the wood fiber, coated with the binder, either before or after collection in frame 26, is moved to a press arrangement wherein the final form and thickness of the wood fiber product is achieved under pressure and temperature. The temperature causes the binder to set in the final reconstituted wood fiber product. All of these subsequent steps are performed in a conventional manner.

An auxiliary frame extension 54 can be provided if it is desired to provide a mat with a greater depth than that which can be provided in frame 26.

Both frames 26 and 54 are suitably lined to prevent adherence of the materials to their inner walls, for example lined with plexiglas 29 or are treated with an antistatic coating.

An added advantage of this mat forming apparatus is that in transporting the materials through hose 12 and blower 10, the moisture content of wet fibers can be inherently greatly reduced. For example, in the case of wood fibers, it has been recognized that the moisture content can be reduced to as low as 50%. With the preferred embodiment, it is also possible to provide heated air or an auxiliary heating arrangement associated with hose 12 to achieve even further drying of the materials. That heater can be in the form as shown in FIG. 1 where a heater 58 is wrapped on coil 12 and energized from a suitable electrical source 60.

In the preferred embodiment, the hose 12 has a diameter of 1¼". However, larger diameters may be preferred when larger size materials are being used to form mats. Whereas the diameter of spout 14 is approximately 4", its size and shape can be modified to define the discharge materials in a predetermined path. In addition, spout 14 may be provided with a nozzle 62 which operates to further confine the discharge of the materials for better placement of those materials in the frame 26. The advantage, as stated above, is that materials are broken down in the hose 12 to discrete fibers or smaller clumps. This comes about due to the interrupted interior surface of the corrugated hose where the turbulence causes friction, impaction, rubbing and shearing action between the fibers and/or fibers otherwise clumped into a ball. In addition, where it is desired to mix several different materials which will go into the make-up of the mat, this same phenomena insures thorough mixing within the hose.

Another advantage is the fibers, throughout their transport to the mat, are generally confined and not exposed to the environment. This reduces the discharge into the area surrounding the apparatus of undesirable particles, dust, and like.

FIG. 5 illustrates an alternative embodiment. Here a battery of parallel, defined open spaces are assembled into a honeycomb plate 61 and is positioned beneath screen 44 on the exhaust box. With this plate 61, the positioning of fibers in the frame can be naturally and pneumatically guided by the preferential flow of air through the mat where less materials are deposited. This process assists in making mats with more uniform thickness if desired.

Although this invention has been illustrated and described in connection with particular embodiments thereof, it will be apparent to those skilled in the art that various changes and modifications may be made therein without departing from the spirit of the invention or from the scope of the appended claims.

I claim:

1. Material handling apparatus comprising, in combination,
    a hollow material transporting member comprising an elongated, hollow corrugated tube one end of which is open and the other end of which is attached to the inlet end of said blower to produce said pressure drop across the ends of said corrugated tube,
    drive means, including a blower, for producing a pressure differential across spaced portions of said transporting member so that material is propelled from one of said spaced portions to the other within said hollow transporting member,
    material directing means, communicating with said drive means, for receiving material from said hollow transporting means and, responsive to said drive means, operative to direct said received material in a predetermined path, said directing means comprising a hollow, generally movable tubular member on end of which is connected to the outlet of said blower and the other end of which is freely movable,
    said hollow transporting member having a non-linear inner surface in cross section so that flow in said hollow transporting member is turbulent causing said material being transported therein to experience turbulent flow in being propelled from one of said spaced portions to the other,
    means associated with said material directing means for receiving said material and confining said received material in a defined space, said means for receiving said material including a frame having spaced ends joined by means defining a generally continuous wall extending between said spaced ends, and including means extending across one of said spaced ends and having an interstitial type member of a generally open construction which is permeable to air while preventing the passage therethrough of material so that material is accumulated in said frame.

2. The apparatus of claim 1 including exhaust means associated with said one end of said frame for receiving air passing through said one end, said exhaust means comprising
    means defining a space having an open end arranged at and communicating with said one end of said frame,
    and means for exhausting air from the interior of said exhaust means space.

3. Material mat forming apparatus comprising, in combination, blower means, said blower means including a centrifugal blower having an inlet and an outlet, an elongated, hollow corrugated tube one end of which is open and the other end of which is attached to the inlet of said blower so that said blower means produces a pressure differential across the ends of said corrugated tube so that material is propelled from the open end of said corrugated tube to the other and through said blower, a hollow, generally movable tubular member one end of which is connected to the outlet of said blower and the other end of which is freely movable and operative to direct said received material in a predetermined path, said corrugated tube defining a non-linear inner surface so that flow in said corrugated tube is turbulent causing said materials being transported therein to experience turbulent flow in being propelled from said open end to said blower means, and means associated with said hollow generally flexible member for receiving said materials and confining said received materials in a defined space, said means for receiving said material including a frame having spaced ends joined by means defining a generally continuous wall extending between said spaced ends, and including means extending across one of said spaced ends and having an interstitial type member of generally open construction permeable to air while preventing the passage therethrough of material so that material is accumulated in said frame.

4. The apparatus of claim 3 including exhaust means associated with said one end of said frame for receiving air passing through said one end, said exhaust means comprising means defining a space having an open end arranged at and communicating with said one end of said frame, and means for exhausting air from the interior of said exhaust means space.

5. The apparatus of claim 4 wherein said means extending across one of said spaced frame ends is a screen member.

6. The apparatus of claim 5 including a second screen member extending across the open end of said exhaust means which communicates with said one end of said frame.

7. The apparatus of claim 3 including a honeycomb member positioned below said interstitial type member and defining discrete, selected openings beneath said screen.

* * * * *